US012717095B2

(12) United States Patent
Shimada et al.

(10) Patent No.: US 12,717,095 B2
(45) Date of Patent: Aug. 25, 2026

(54) OPTICAL MODULE, OPTICAL CONNECTOR CABLE, AND METHOD FOR PRODUCING OPTICAL MODULE

(71) Applicant: SUMITOMO ELECTRIC INDUSTRIES, LTD., Osaka (JP)

(72) Inventors: Kensaku Shimada, Osaka (JP); Takeshi Inoue, Osaka (JP); Takuya Ishida, Osaka (JP); Tatsuhiko Naito, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 393 days.

(21) Appl. No.: 18/579,938

(22) PCT Filed: Jul. 5, 2022

(86) PCT No.: PCT/JP2022/026758

§ 371 (c)(1),
(2) Date: Jan. 17, 2024

(87) PCT Pub. No.: WO2023/013348

PCT Pub. Date: Feb. 9, 2023

(65) Prior Publication Data

US 2024/0319451 A1 Sep. 26, 2024

(30) Foreign Application Priority Data

Aug. 5, 2021 (JP) ................................ 2021-128966

(51) Int. Cl.
*H04B 10/00* (2013.01)
*G02B 6/42* (2006.01)

(52) U.S. Cl.
CPC .................................. *G02B 6/4204* (2013.01)

(58) Field of Classification Search
CPC .. G02B 6/4204; G02B 6/4239; G02B 6/4249; G02B 6/4257; G02B 6/4284; G02B 6/4214; H10F 77/40
See application file for complete search history.

(56) References Cited

U.S. PATENT DOCUMENTS 4,980,217 A * 12/1990 Grundfest ............. H05K 1/115
428/209
6,224,965 B1 * 5/2001 Haas ................... H05K 3/0032
428/209
(Continued)

FOREIGN PATENT DOCUMENTS

JP H04-341804 A 11/1992
JP 2002-208763 A 7/2002
(Continued)

*Primary Examiner* — Agustin Bello
(74) *Attorney, Agent, or Firm* — Oliff PLC

(57) ABSTRACT

An optical module includes a substrate, an optical element, an optical coupling module, and an adhesive. The substrate includes a glass cloth therein. The optical element is mounted on the substrate. The optical coupling module is configured to be optically coupled to the optical element. The adhesive fixes the optical coupling module to the substrate. A cavity recessed from a first main surface of the substrate toward a second main surface of the substrate so as to include a bottom portion is formed in the substrate. At least a part of the optical coupling module is accommodated in the cavity. The glass cloth includes a protruding portion protruding into the cavity from a side surface of the cavity. The protruding portion is stuck into the adhesive positioned between the side surface and the optical coupling module.

15 Claims, 10 Drawing Sheets

(56) References Cited

U.S. PATENT DOCUMENTS

| | | | | |
|---|---|---|---|---|
| 6,558,780 | B2 * | 5/2003 | Suzuki | H05K 3/4069 428/209 |
| 7,056,571 | B2 * | 6/2006 | Tomekawa | H05K 1/0366 428/209 |
| 7,796,845 | B2 * | 9/2010 | Murai | H05K 3/0032 438/662 |
| 8,153,909 | B2 * | 4/2012 | Katagiri | H05K 3/421 174/262 |
| 8,431,833 | B2 * | 4/2013 | Kajihara | H05K 3/0032 174/265 |
| 8,692,135 | B2 * | 4/2014 | Funaya | H05K 1/115 361/764 |
| 9,641,254 | B1 * | 5/2017 | Shen | G02B 6/4269 |
| 10,542,625 | B2 * | 1/2020 | Ota | H05K 1/0366 |
| 2002/0127379 | A1 * | 9/2002 | Suzuki | H05K 1/0366 428/209 |
| 2004/0033446 | A1 * | 2/2004 | Kim | H05K 1/0274 430/323 |
| 2006/0067064 | A1 * | 3/2006 | Crews | H01R 12/714 361/764 |
| 2006/0140630 | A1 * | 6/2006 | Popovich | F28F 1/405 398/58 |
| 2006/0223307 | A1 * | 10/2006 | Gotoh | B23K 26/382 438/640 |
| 2007/0269159 | A1 * | 11/2007 | Dangler | H05K 1/02 385/14 |
| 2008/0008477 | A1 * | 1/2008 | Ogawa | G02B 6/43 398/164 |
| 2009/0066877 | A1 * | 3/2009 | Abe | G02F 1/133603 349/62 |
| 2012/0269522 | A1 * | 10/2012 | Kagaya | H05K 1/025 333/204 |
| 2013/0070479 | A1 * | 3/2013 | Ito | G02B 6/0068 362/609 |
| 2013/0070481 | A1 * | 3/2013 | Ito | G02B 6/0031 362/613 |
| 2013/0270427 | A1 * | 10/2013 | Hsiao | H10F 77/50 250/227.28 |
| 2017/0104138 | A1 * | 4/2017 | Shatalov | H10H 20/854 |
| 2017/0277913 | A1 * | 9/2017 | Berge | H04B 10/85 |
| 2017/0279532 | A1 * | 9/2017 | Bartley | H04B 10/80 |
| 2018/0177042 | A1 * | 6/2018 | Kagaya | H05K 1/0228 |
| 2019/0016065 | A1 * | 1/2019 | Jia | B29C 70/443 |
| 2019/0129106 | A1 * | 5/2019 | Inoue | G02B 6/4214 |
| 2019/0139722 | A1 * | 5/2019 | Chen | G06F 3/0202 |
| 2019/0317284 | A1 * | 10/2019 | Matsuoka | G02B 6/4214 |
| 2020/0081208 | A1 * | 3/2020 | Leigh | G02B 6/421 |
| 2021/0083780 | A1 * | 3/2021 | Nakayama | H05K 1/025 |
| 2021/0173159 | A1 * | 6/2021 | Yanagisawa | G02B 6/4245 |
| 2021/0239925 | A1 * | 8/2021 | Kagaya | H01S 5/0427 |
| 2024/0319451 | A1 * | 9/2024 | Shimada | G02B 6/4249 |

FOREIGN PATENT DOCUMENTS

| | | | |
|---|---|---|---|
| JP | 2004-288795 | A | 10/2004 |
| JP | 2006-130632 | A | 5/2006 |
| JP | 2008-290347 | A | 12/2008 |
| JP | 2010-122312 | A | 6/2010 |
| JP | 2015-222312 | A | 12/2015 |
| JP | 2017-110104 | A | 6/2017 |
| JP | 2019-082508 | A | 5/2019 |

* cited by examiner

OPTICAL MODULE, OPTICAL CONNECTOR CABLE, AND METHOD FOR PRODUCING OPTICAL MODULE

TECHNICAL FIELD

The present disclosure relates to an optical module, an optical connector cable, and a method for manufacturing an optical module. The present application claims the priority based on Japanese Patent Application No. 2021-128966, filed on Aug. 5, 2021, the entire content described in the application is incorporated herein by reference.

BACKGROUND ART

Patent Literature 1 discloses an optical component as an example of an optical module including a substrate having an optical element mounted therein, and an optical coupling module optically coupled to the optical element. In the optical module, light emitted from optical fibers held by the optical coupling module is incident on the optical element mounted on the substrate via the optical coupling module.

CITATION LIST

Patent Literature

[Patent Literature 1] Japanese Unexamined Patent Publication No. 2019-082508

SUMMARY OF INVENTION

An optical module of the present disclosure includes a substrate, an optical element, an optical coupling module, and an adhesive. The substrate includes a glass cloth therein. The optical element is mounted on the substrate. The optical coupling module is configured to be optically coupled to the optical element. The adhesive fixes the optical coupling module to the substrate. A cavity recessed from a first main surface of the substrate toward a second main surface of the substrate so as to include a bottom portion is formed in the substrate. At least a part of the optical coupling module is accommodated in the cavity. The glass cloth includes a protruding portion protruding into the cavity from a side surface of the cavity. The protruding portion is stuck into the adhesive positioned between the side surface and the optical coupling module.

An optical connector cable of the present disclosure includes the optical module described above, and an optical fiber cable. The optical fiber cable includes optical fibers. The optical fiber cable is attached to the optical module such that the optical fibers are optically coupled to the optical element via the optical coupling module.

A method for manufacturing an optical module of the present disclosure includes preparing a substrate including a glass cloth, forming a cavity recessed from a first main surface of the substrate toward a second main surface of the substrate in the substrate so as to include a bottom portion, and accommodating at least a part of an optical coupling module configured to be optically coupled to an optical element inside the cavity and fixing the optical coupling module to the substrate using an adhesive. In the forming the cavity, a part of the glass cloth is caused to protrude into the cavity from a side surface as a protruding portion. In the fixing the optical coupling module to the substrate, the adhesive is applied to the inside of the cavity such that the protruding portion is stuck into the adhesive.

DESCRIPTION OF EMBODIMENT

Figure 1:
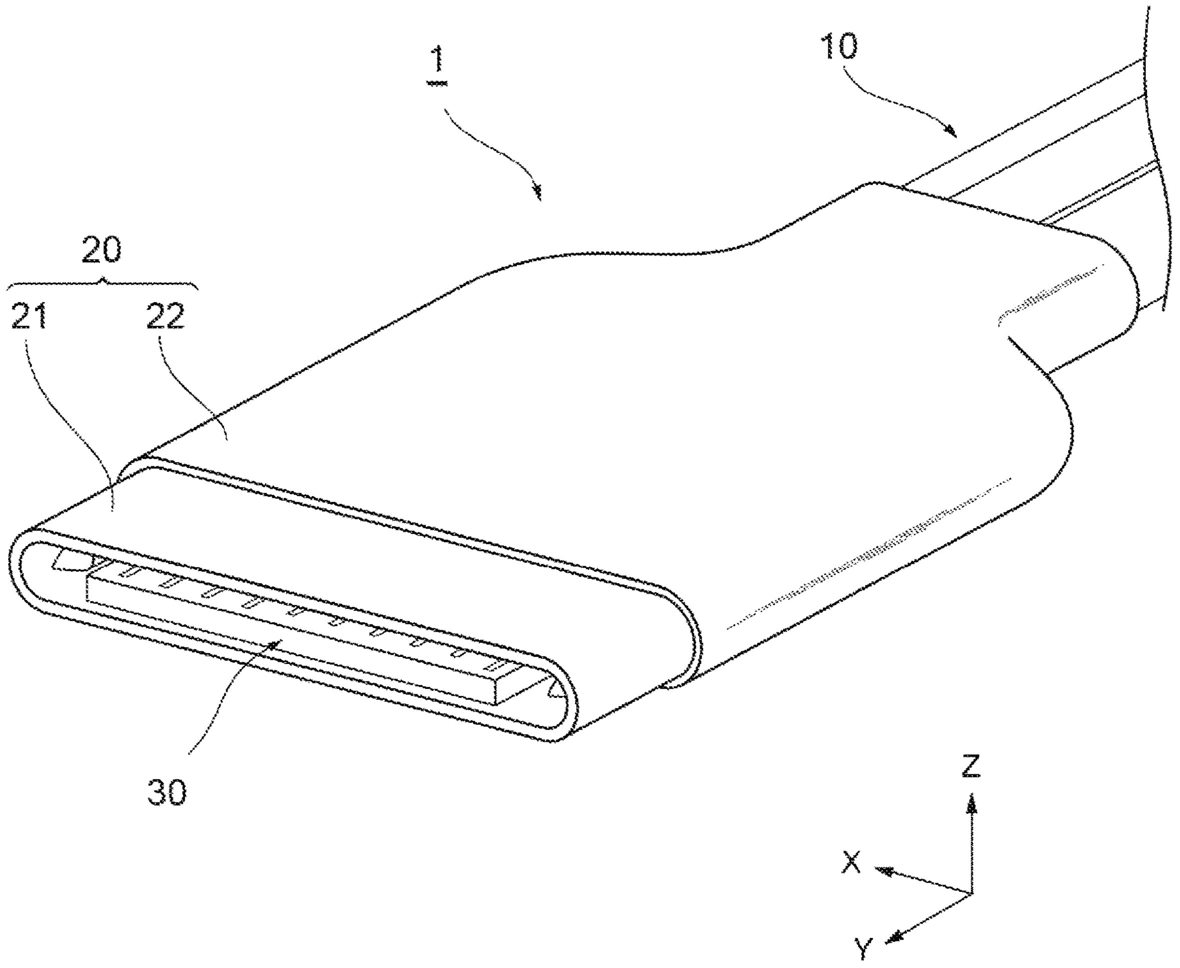
FIG. 1 is a perspective view illustrating an end portion of an optical connector cable according to an embodiment.

Problem to be Solved by Present Disclosure

The optical module disclosed in Patent Literature 1 has a structure in which an optical coupling module is mounted in a substrate. The optical coupling module is attached to the substrate using an adhesive. However, for example, the size of the optical coupling module is small, and the amount of applied adhesive may be limited. Hence, it is desired to develop an optical module in which an adhesive strength of an optical coupling module with respect to a substrate can be improved.

An object of the present disclosure is to provide an optical module, an optical connector cable, and a method for manufacturing an optical module, in which an adhesive strength of an optical coupling module with respect to a substrate can be improved.

Effects of Present Disclosure

According to the present disclosure, it is possible to improve an adhesive strength of an optical coupling module with respect to a substrate.

DESCRIPTION OF EMBODIMENT OF PRESENT DISCLOSURE

First, details of an embodiment of the present disclosure will be listed and described. An optical module according to one embodiment includes a substrate, an optical element, an optical coupling module, and an adhesive. The substrate includes a glass cloth therein. The optical element is mounted on the substrate. The optical coupling module is configured to be optically coupled to the optical element. The adhesive fixes the optical coupling module to the substrate. A cavity recessed from a first main surface of the substrate toward a second main surface of the substrate so as to include a bottom portion is formed in the substrate. At least a part of the optical coupling module is accommodated in the cavity. The glass cloth includes a protruding portion protruding into the cavity from a side surface of the cavity. The protruding portion is stuck into the adhesive positioned between the side surface and the optical coupling module.

In this optical module, a part of the glass cloth (protruding portion) protrudes into the cavity from the side surface of the cavity. In addition, the protruding portion is stuck into the adhesive fixing the optical coupling module to the substrate. Accordingly, a contact area between the adhesive and the substrate increases by a surface area of the protruding portion, and the protruding portion can function as an anchor with respect to the adhesive. For this reason, the adhesive strength of the optical coupling module with respect to the substrate can be improved.

As one embodiment, the glass cloth may be constituted of glass threads serving as weft and warp. The side surface may be formed in an extension direction of at least one of the weft and the warp when viewed in a thickness direction of the substrate. In this case, since the protruding portion having a large length is formed, the contact area between the adhesive and the substrate further increases. For this reason, the adhesive strength of the optical coupling module with respect to the substrate can be further improved. The glass threads constituting at least one of the weft and the warp may be formed of bundles of a plurality of glass filaments, and a diameter of each of the plurality of glass filaments may be equal to or less than 10 μm. A weave density of the glass threads in at least one of the weft and the warp may be equal to or more than 50 threads/25 mm and equal to or less than 100 threads/25 mm.

As one embodiment, the optical coupling module may be accommodated inside the cavity such that a gap is provided between the side surface of the cavity and the optical coupling module. The adhesive may be disposed in the gap. A width of the gap may be equal to or more than 50 μm and equal to or less than 750 μm. In this case, since the adhesive can be stored inside the gap where the protruding portion is positioned, a surface of the protruding portion can be adequately brought into contact with the adhesive. In addition, since the width of the gap is equal to or more than 50 μm and equal to or less than 750 μm, a moderate amount of adhesive can be stored inside the gap. For this reason, the adhesive strength of the optical coupling module with respect to the substrate can be further improved.

As one embodiment, a length of the protruding portion may be equal to or more than 100 μm and equal to or less than 1 mm. In this case, since the length of the protruding portion is equal to or more than 100 μm, the contact area on the surface of the protruding portion with respect to the adhesive can be sufficiently secured. For this reason, the adhesive strength of the optical coupling module with respect to the substrate can be further improved. In addition, since the length of the protruding portion is equal to or less than 1 mm, the protruding portion is unlikely to be a hindrance to accommodation when the optical coupling module is accommodated inside the cavity. For this reason, the optical coupling module can be easily accommodated in the cavity.

As one embodiment, the optical coupling module may include a holding portion for holding end portions of optical fibers optically coupled to the optical element via the optical coupling module. In this case, since the end portions of the optical fibers are adequately held by the holding portion of the optical coupling module, optical coupling between the optical element and the optical fibers can be more accurately performed.

As one embodiment, a penetration hole penetrating the bottom portion to the second main surface may be formed in the cavity. The optical element may be mounted on the second main surface so as to overlap the penetration hole when viewed from above the second main surface. In this case, the optical coupling module and the optical element mounted on the second main surface of the substrate can be optically coupled through a simple constitution such as a penetration hole.

As one embodiment, the cavity may include a first cavity and a second cavity including a second bottom portion positioned closer to the second main surface than a first bottom portion of the first cavity. In this case, the entire region of the cavity can be made smaller by making only the cavity part mainly accommodating components such as a lens that is likely to become a component protruding from a lower surface of the optical coupling module be deep and making other parts be shallower than the cavity part. As a result, the strength of the substrate can be maintained even by a constitution in which a cavity is provided in the substrate. The first bottom portion of the first cavity may be provided with a positioning hole recessed from the first bottom portion to the second main surface. The second bottom portion of the second cavity may be provided with a plurality of penetration holes penetrating the second bottom portion to the second main surface.

An optical connector cable according to one embodiment includes any of the optical modules described above, and an optical fiber cable. The optical fiber cable includes at least one optical fiber. The optical fiber cable is attached to the optical module such that the optical fiber is optically coupled to the optical element via the optical coupling module. In this optical connector cable, similarly to the optical module described above, the adhesive strength of the optical coupling module with respect to the substrate can be improved.

A method for manufacturing an optical module according to one embodiment includes preparing a substrate including a glass cloth, forming a cavity recessed from a first main surface of the substrate toward a second main surface of the substrate in the substrate so as to include a bottom portion, and accommodating at least a part of an optical coupling module configured to be optically coupled to an optical element inside the cavity and fixing the optical coupling module to the substrate using an adhesive. In the forming the cavity, a part of the glass cloth is caused to protrude into the cavity from a side surface of the cavity as a protruding portion. In the fixing the optical coupling module to the substrate, the adhesive is applied to the inside of the cavity such that the protruding portion is stuck into the adhesive.

In this method for manufacturing an optical module, a part of the glass cloth is caused to protrude into the cavity from the side surface of the cavity as a protruding portion. In addition, the adhesive is applied such that the protruding portion is stuck into the adhesive. Accordingly, the contact area between the adhesive and the substrate increases by the surface area of the protruding portion, and the protruding portion can function as an anchor with respect to the adhesive. For this reason, the adhesive strength of the optical coupling module with respect to the substrate can be improved.

Details of Embodiment of Present Disclosure

Specific examples of an optical module, an optical connector cable, and a method for manufacturing an optical module according to the present disclosure will be described below with reference to the drawings. The present disclosure is not limited to these examples, and is indicated by the claims, and it is intended to include all the changes within meaning and a range equivalent to the claims. The same reference signs will be applied to the same elements in description of the drawings, and the repeated description thereof will be omitted.

Figure 2:
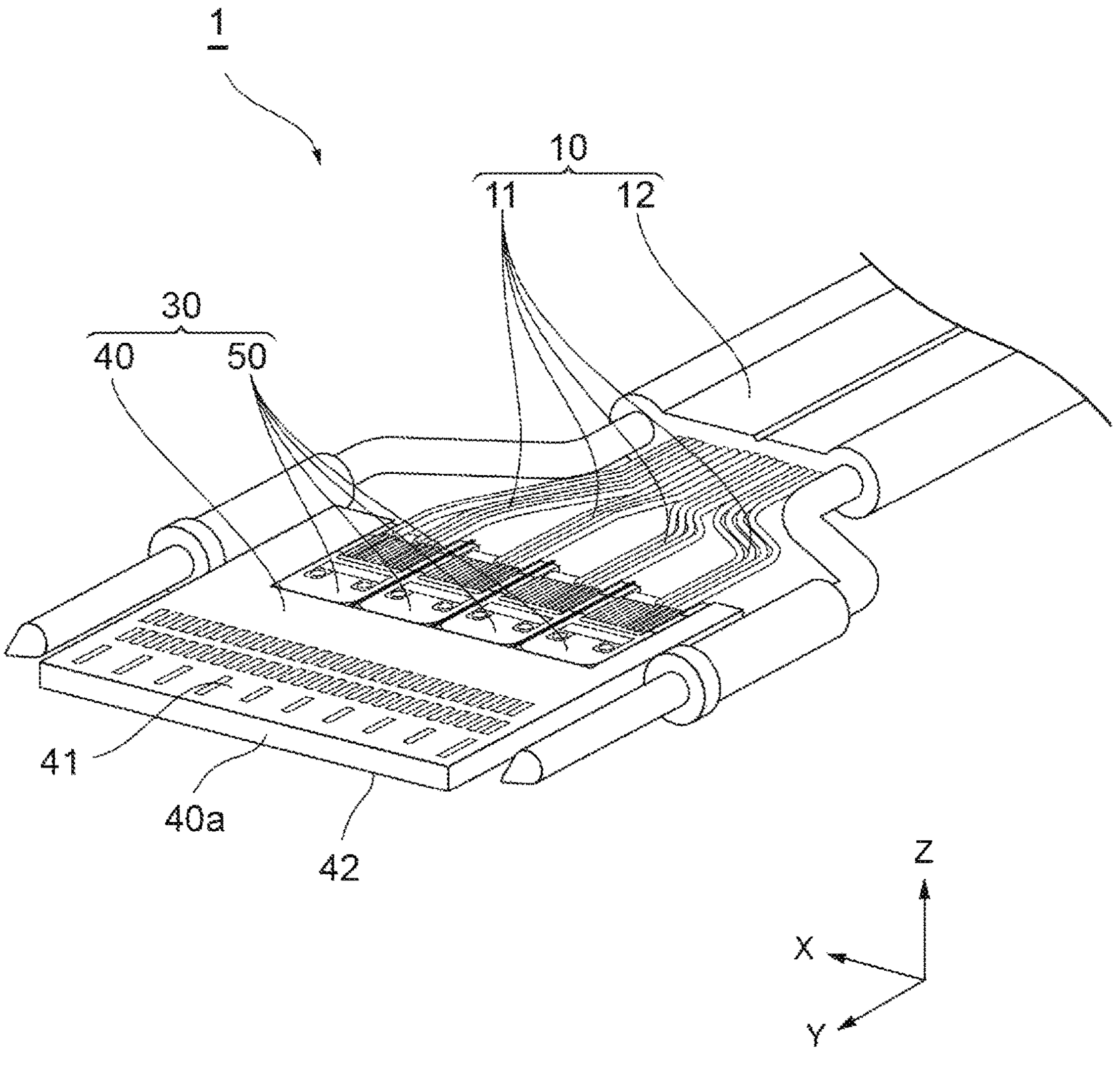
FIG. 2 is a perspective view illustrating the end portion of the optical connector cable from which a protective member is removed.

With reference to FIGS. 1 and 2, an optical connector cable 1 according to an embodiment will be described. FIG. 1 is a perspective view illustrating an end portion of the optical connector cable 1 according to the embodiment. FIG. 2 is a perspective view illustrating the end portion of the optical connector cable 1 from which a protective member 20 is removed. Hereinafter, for the sake of description, a width direction of the end portion of the optical connector cable 1 will be regarded as a direction X, an extension direction of the end portion will be regarded as a direction Y, and a thickness direction of the end portion will be regarded as a direction Z. In the present embodiment, the direction X, the direction Y, and the direction Z are orthogonal to each other.

For example, the optical connector cable 1 is a cable used for transmitting and receiving optical signals between devices. As illustrated in FIGS. 1 and 2, the optical connector cable 1 includes an optical fiber cable 10, the protective member 20, and an optical module 30. In FIGS. 1 and 2, one end of the optical fiber cable 10 is illustrated. The other end of the optical fiber cable 10 may also have a similar constitution.

As illustrated in FIG. 2, the optical fiber cable 10 has a plurality of optical fibers 11 and a cable sheath 12. Each of the optical fibers 11 is a member for transmitting optical signals. A great part of each of the optical fibers 11 is accommodated inside the cable sheath 12. A tip part of each of the optical fibers 11 is exposed to the outside of the cable sheath 12. The plurality of optical fibers 11 are arranged in the direction X in a one-dimensional manner. Inside the cable sheath 12, all the optical fibers 11 are accommodated close to each other in a bundle. Meanwhile, outside the cable sheath 12, the plurality of optical fibers 11 branch into several (in the present embodiment, four to six) bundles, and an end portion of each of the bundles is held by each optical coupling module 50. For example, each of the optical fibers 11 has a glass fiber and a coating resin. For example, the glass fiber includes a core and a cladding surrounding the core. Each of the optical fibers 11 may be a single-mode optical fiber (SMF) or a multi-mode optical fiber (MMF).

As illustrated in FIG. 1, the protective member 20 is a member having a flat shape extending in the direction X and the direction Y. The optical module 30 is accommodated inside the protective member 20. The protective member 20 protects the optical module 30 from an external impact or the like. The protective member 20 has a laminated structure constituted of an inner layer 21 and an outer layer 22 covering the inner layer 21. For example, the inner layer 21 is formed of a metal. For example, the outer layer 22 is formed of a resin. At the tip of the optical connector cable 1, a part of the inner layer 21 is exposed from the outer layer 22. For example, the exposed part of the inner layer 21 is inserted into a socket provided in a device to which the optical connector cable 1 is connected.

Figure 3:
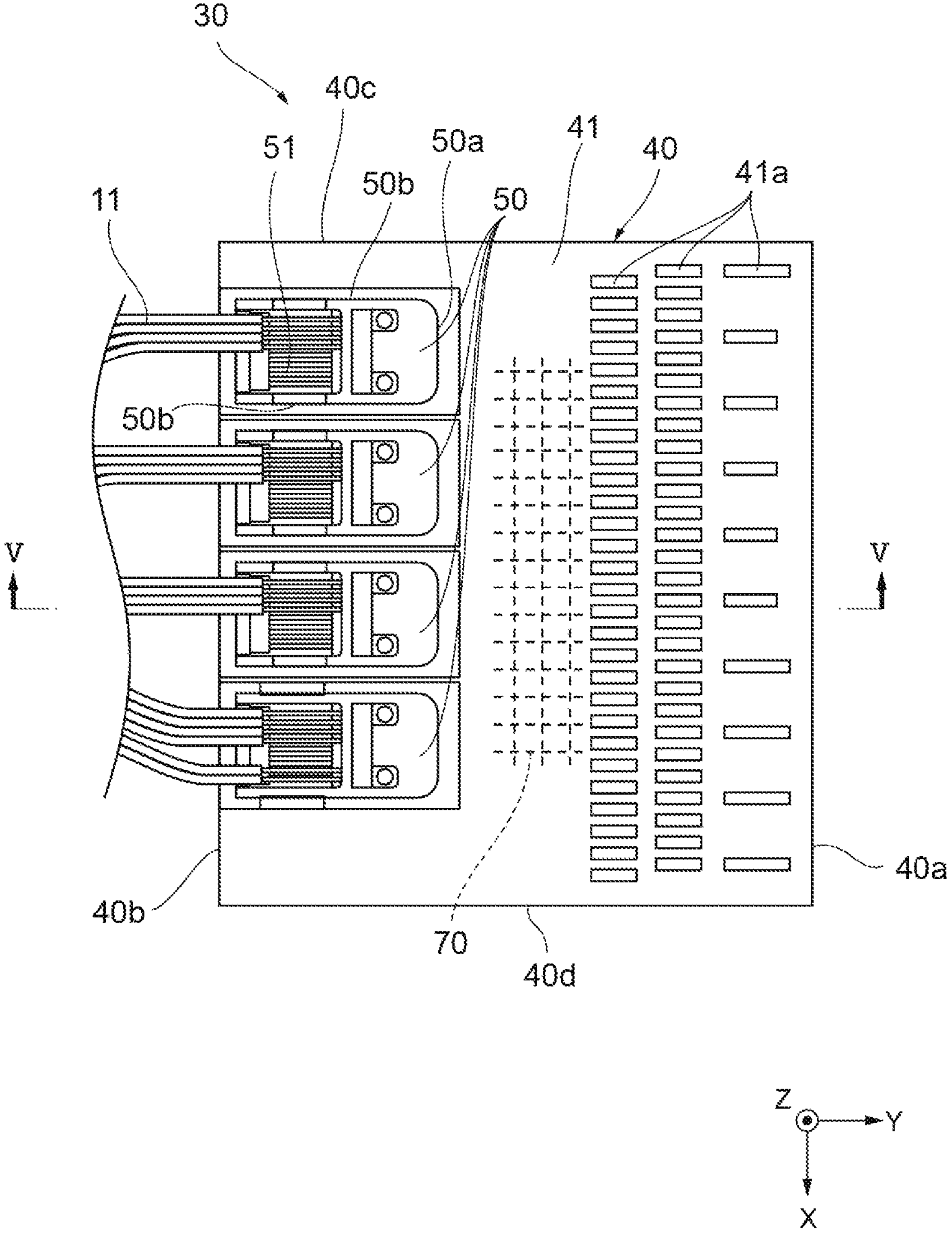
FIG. 3 is a plan view of an optical module viewed from above a first main surface of a substrate.
Figure 4:
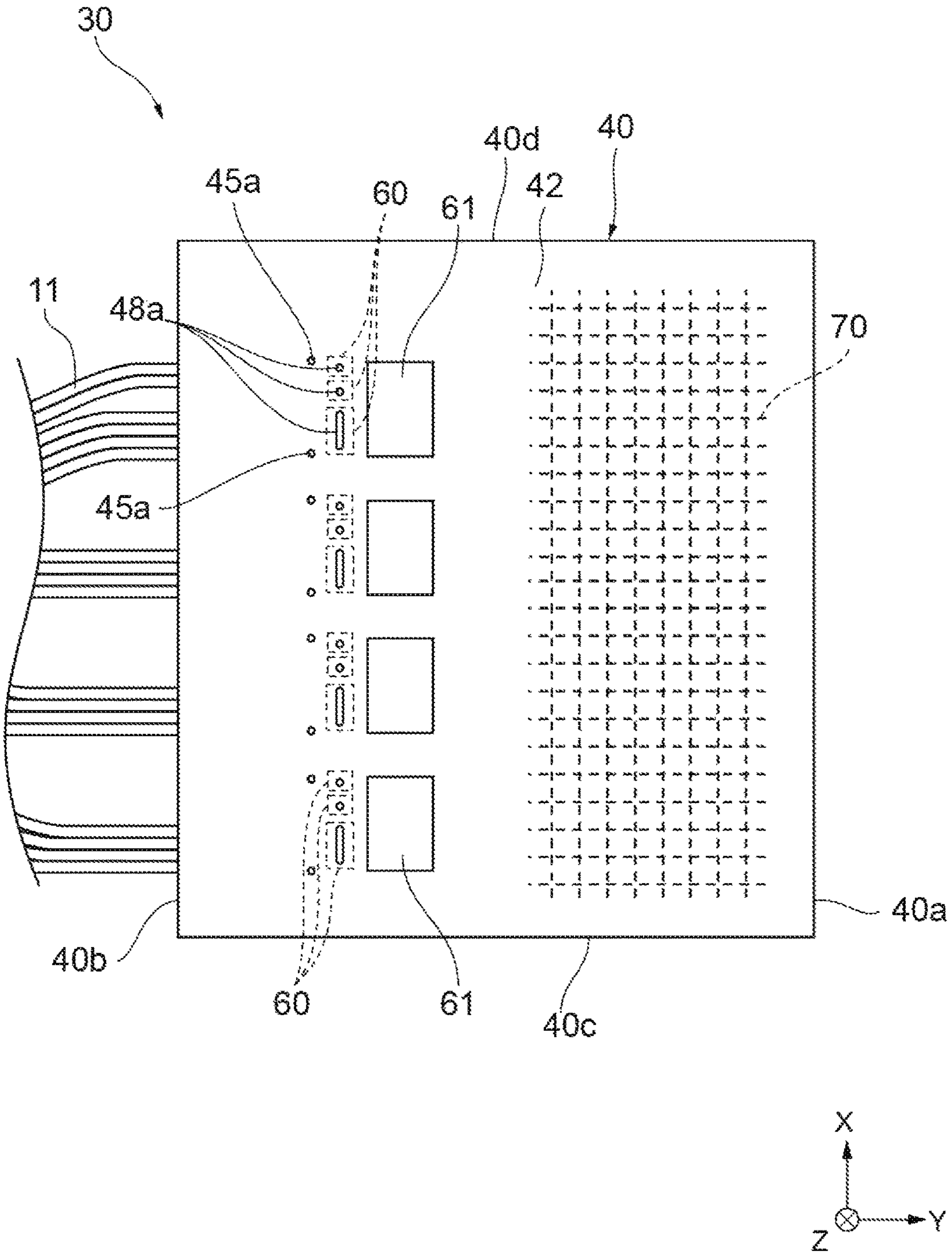
FIG. 4 is a plan view of the optical module viewed from above a second main surface of the substrate.
Figure 5:
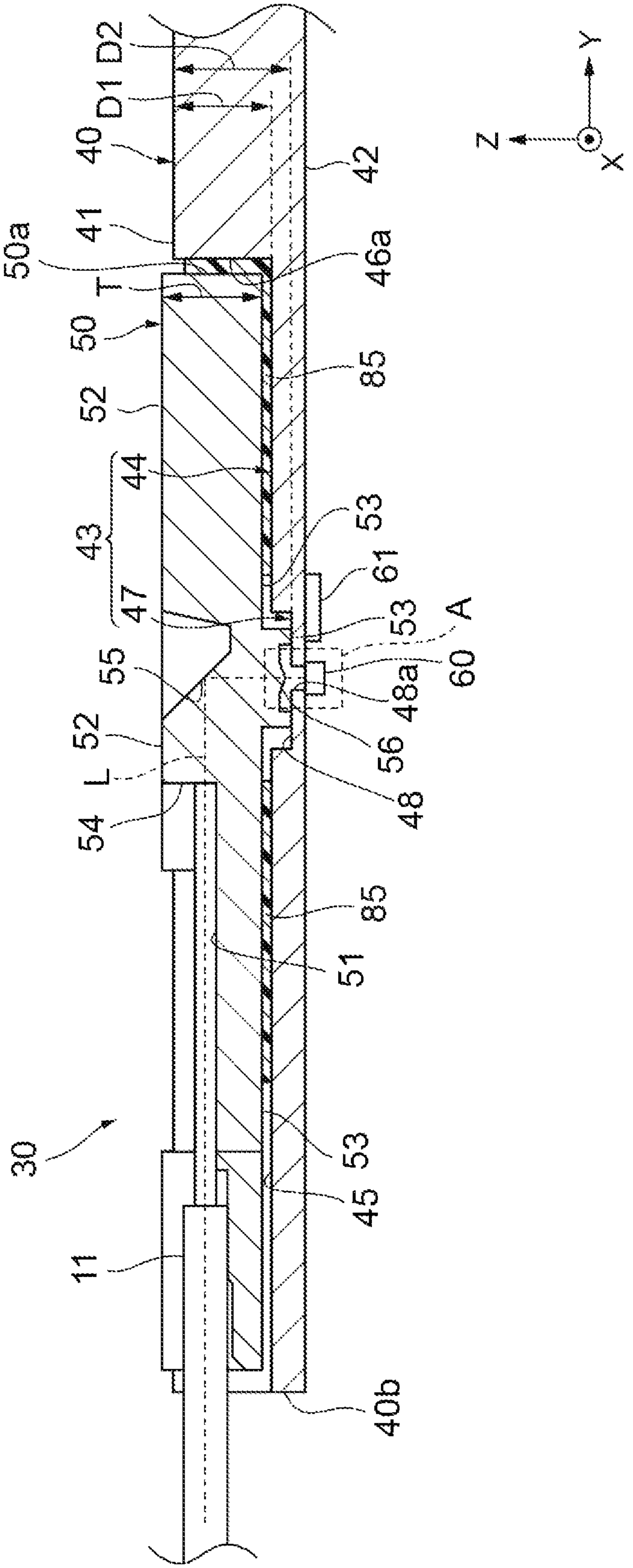
FIG. 5 is a cross-sectional view when the optical module is cut along line V-V indicated in FIG. 3.
Figure 6:
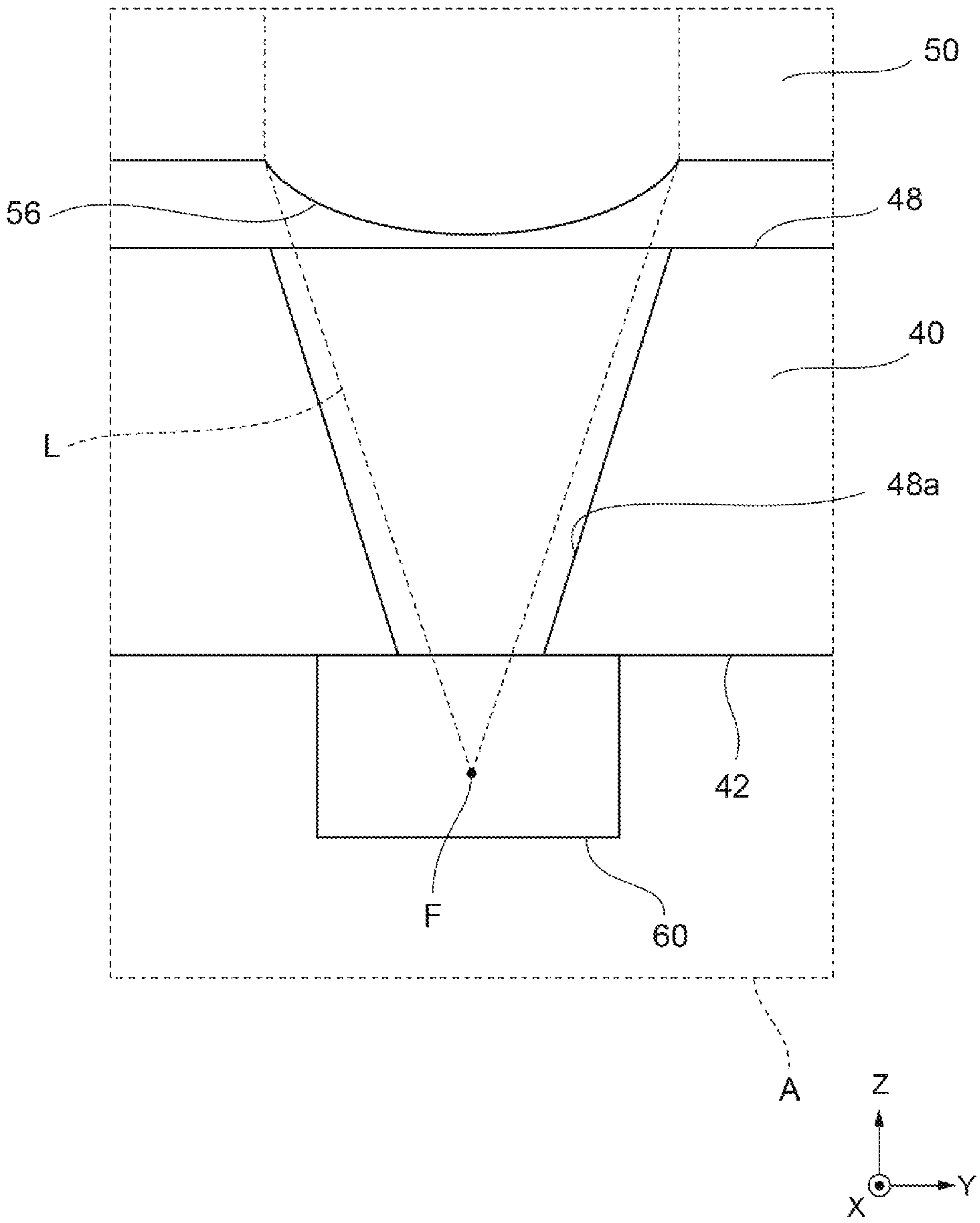
FIG. 6 is an enlarged view of a part surrounded by a dotted line A indicated in FIG. 5.

Next, the optical module 30 will be described with reference to FIGS. 3 to 6. FIG. 3 is a plan view of the optical module 30 viewed from above a first main surface 41 of a substrate 40. FIG. 4 is a plan view of the optical module 30 viewed from above a second main surface 42 of the substrate 40. FIG. 5 is a cross-sectional view when the optical module 30 is cut along line V-V indicated in FIG. 3. FIG. 6 is an enlarged view of a part surrounded by a dotted line A indicated in FIG. 5. The optical module 30 includes the substrate 40, a plurality of optical coupling modules 50, a plurality of optical elements 60, and a plurality of ICs 61.

The substrate 40 is a plate-shaped member on which various kinds of optical elements and electronic elements are mounted. The substrate 40 is a multilayer substrate constituted of a plurality of laminated resin layers or a single-layer substrate constituted of one resin layer. For example, the resin layer is formed of an epoxy resin, a polyimide resin, or a fluororesin. In the present embodiment, a thickness direction of the substrate 40 coincides with the direction Z. The substrate 40 has a pair of side surfaces 40*a* and 40*b* extending in the direction X and a pair of side surfaces 40*c* and 40*d* extending in the direction Y when viewed in the direction Z. When viewed in the direction Z, an outer edge of the substrate 40 has a rectangular shape defined by the pair of side surfaces 40*a* and 40*b* and the pair of side surfaces 40*c* and 40*d*. That is, the substrate 40 is a rectangular substrate. The substrate 40 has the first main surface 41 and the second main surface 42 facing each other in the direction Z. The thickness of the substrate 40 may be equal to or more than 0.2 mm and equal to or less than 0.8 mm.

The substrate 40 has at least one piece of glass cloth 70 therein. The glass cloth 70 is woven fabric constituted of glass threads serving as warp and weft. In FIGS. 3 and 4, for the sake of convenience of description, only a part of the glass cloth 70 is illustrated. However, in the present embodiment, the glass cloth 70 is provided in the entire area of the substrate 40 when viewed in the direction Z. That is, when viewed in the direction Z, an outer edge of the glass cloth 70 coincides with the outer edge of the substrate 40. When the substrate 40 is a multilayer substrate, the glass cloth 70 may be provided in each of the plurality of resin layers constituting the substrate 40. In the present embodiment, the substrate 40 is a multilayer substrate, and a plurality of pieces of glass cloth 70 are laminated in the direction Z. A detailed constitution of the glass cloth 70 will be described below.

Various kinds of wirings (not illustrated) for electrically connecting the ICs 61 and other electronic elements are provided on an inward side of the substrate 40. In the following description, an end portion where the side surface 40*a* is positioned in the direction Y may be regarded as a tip of the optical module 30, and an end portion where the side surface 40*b* is positioned may be regarded as a base end of the optical module 30. In addition, a surface where the first main surface 41 is positioned in the direction Z may be regarded as an upper surface of the optical module 30, and a surface where the second main surface 42 is positioned may be regarded as a lower surface of the optical module 30.

As illustrated in FIG. 3, the first main surface 41 is a surface extending in the direction X and the direction Y and has a rectangular shape in a plan view. A plurality of patterns 41*a*, which are metal films, are provided in a region near the side surface 40*a* on the first main surface 41. For example, each of the patterns 41*a* may be connected to the ICs 61 via the wirings or the like inside the substrate 40. Meanwhile, the plurality of optical coupling modules 50 are placed side by side in the direction X in a region near the side surface 40*b* on the first main surface 41.

As illustrated in FIG. 4, the second main surface 42 is a surface extending in the direction X and the direction Y and has a rectangular shape in a plan view. The plurality of optical elements 60 and the plurality of ICs 61 are mounted in a region near the side surface 40*b* on the second main surface 42. In FIG. 4, for the sake of convenience of description, each of the optical elements 60 is indicated by a dotted line. For example, each of the optical elements 60 is a light receiving element such as a photodiode (PD). A light receiving surface of each of the optical elements 60 faces the optical coupling module 50. Each of the optical elements 60 overlaps each penetration hole 48*a* provided in the substrate 40 when viewed from above the second main surface 42 (in the direction Z). Accordingly, the optical element 60 can receive light from the optical coupling module 50 facing it with the substrate 40 interposed therebetween through the penetration hole 48*a*. In order to dispose the optical element 60 on the second main surface 42, the opening area of the penetration hole 48*a* on the second main surface 42 is smaller than the surface area of the surface facing the second main surface 42 in the optical element 60. Each of the ICs 61 is an integrated circuit for controlling operation of the optical element 60. For example, each of the ICs 61 may be connected to the optical element 60 via a wiring inside the substrate 40, a bonding wire, and the like. In the present embodiment, one IC 61 is connected to three optical elements 60. A high communication speed between the IC 61 and the optical element 60 can be maintained by disposing the IC 61 close to (for example, by disposing the IC 61 adjacent to) the optical element 60.

The optical coupling module 50 is a component for optically coupling the optical fibers 11 and the optical elements 60. The optical coupling module 50 is formed of a material allowing light emitted from the optical fibers 11 to be transmitted therethrough (for example, a glass or a light transmitting resin). As illustrated in FIG. 3, the optical coupling module 50 has substantially a rectangular shape when viewed in the direction Z. The optical coupling module 50 has a tip surface 50*a* and a pair of side surfaces 50*b*. The tip surface 50*a* is a surface extending in the direction X and the direction Z and connects the pair of side surfaces 50*b*. Each of the side surfaces 50*b* is a surface extending in the direction Y and the direction Z.

In addition, as illustrated in FIG. 5, the optical coupling module 50 has a groove portion 51, an upper surface 52, a lower surface 53, an abutting surface 54, a mirror 55, and a lens 56. The groove portion 51 is a V-groove extending in the direction Y (a groove having a V-shape in an XZ cross section) and is a holding portion for holding the end portions of the optical fibers 11. The groove portion 51 regulates positions of the optical fibers 11 with respect to the optical coupling module 50 and prevents positional displacement of the optical fibers 11 in the direction X. The end portions of the optical fibers 11 placed in the groove portion 51 are fixed to the groove portion 51, for example, using an adhesive. For example, the adhesive may be a UV curable adhesive or may be a light transmitting adhesive allowing light L emitted from the optical fibers 11 to be transmitted therethrough. The shape of the groove portion 51 is not limited to the V-groove. For example, the shape of the groove portion 51 may be a U-groove having a rounded bottom portion or may be a rectangular groove having a bottom surface extending in the direction X and the direction Y. The holding portion (in the present embodiment, the groove portion 51) for holding the end portions of the optical fibers 11 may not necessarily be provided in the optical coupling module 50. For example, the groove portion 51 may be provided in another component different from the optical coupling module 50. When the groove portion 51 is provided in another component, for example, the optical coupling module 50 may have a pair of projecting portions and another component provided with the groove portion 51 may have a pair of recessed portions. The optical coupling module 50 and another component may be connected by fitting each of the projecting portions of the optical coupling module 50 into each of the recessed portions of another component.

The upper surface 52 is a surface positioned in an upper portion of the optical coupling module 50 and extends in the direction X and the direction Y. The upper surface 52 is positioned near the tip surface 50*a* of the optical coupling module 50 with respect to the groove portion 51. The upper surface 52 is provided with a depression whose surface functions as the mirror 55. The lower surface 53 is a surface positioned in a lower portion of the optical coupling module 50 and extends in the direction X and the direction Y.

The abutting surface 54 is a surface which tip surfaces of the optical fibers 11 abut and extends in the direction X and the direction Z. The abutting surface 54 connects the end portion of the groove portion 51 and the end portion of the upper surface 52 in the direction Y. The light L emitted from the optical fibers 11 passes through the abutting surface 54 and is incident on the mirror 55. The abutting surface 54 and the tip surfaces of the optical fibers 11 may not come into direct contact with each other. For example, a light transmitting adhesive allowing the light L to be transmitted therethrough or a refractive index matching agent may be inserted between the abutting surface 54 and the tip surfaces of the optical fibers 11.

The mirror 55 is a member converting a propagation direction of the light L emitted from the optical fibers 11. The mirror 55 is provided in a manner of being inclined with respect to each of an XY plane and an XZ plane. The mirror 55 receives the light L emitted from the optical fibers 11 in the direction Y and reflects the light L in the direction Z toward the lens 56. An incidence optical axis and a reflection optical axis of the light L may form a right angle, for example. The light L reflected by the mirror 55 is incident on the optical element 60 through the lens 56 and the penetration hole 48*a*.

The lens 56 is a member optically coupled to the optical element 60. The lens 56 is provided in a part protruding toward the second main surface 42 in the direction Z in the optical coupling module 50. As illustrated in FIG. 6, the lens 56 faces the optical element 60 in the direction Z and has a surface curved in a projecting shape toward the optical element 60. A focus F of the lens 56 is positioned inside the optical element 60 with respect to the surface of the optical element 60. The lens 56 converges the light L reflected by the mirror 55 and causes it to be incident on the optical element 60. Various kinds of parameters of the lens 56 (for example, the surface shape, the size, the material, and the like of the lens 56) are optimized such that the focus F of the lens 56 is positioned inside the optical element 60.

Figure 7:
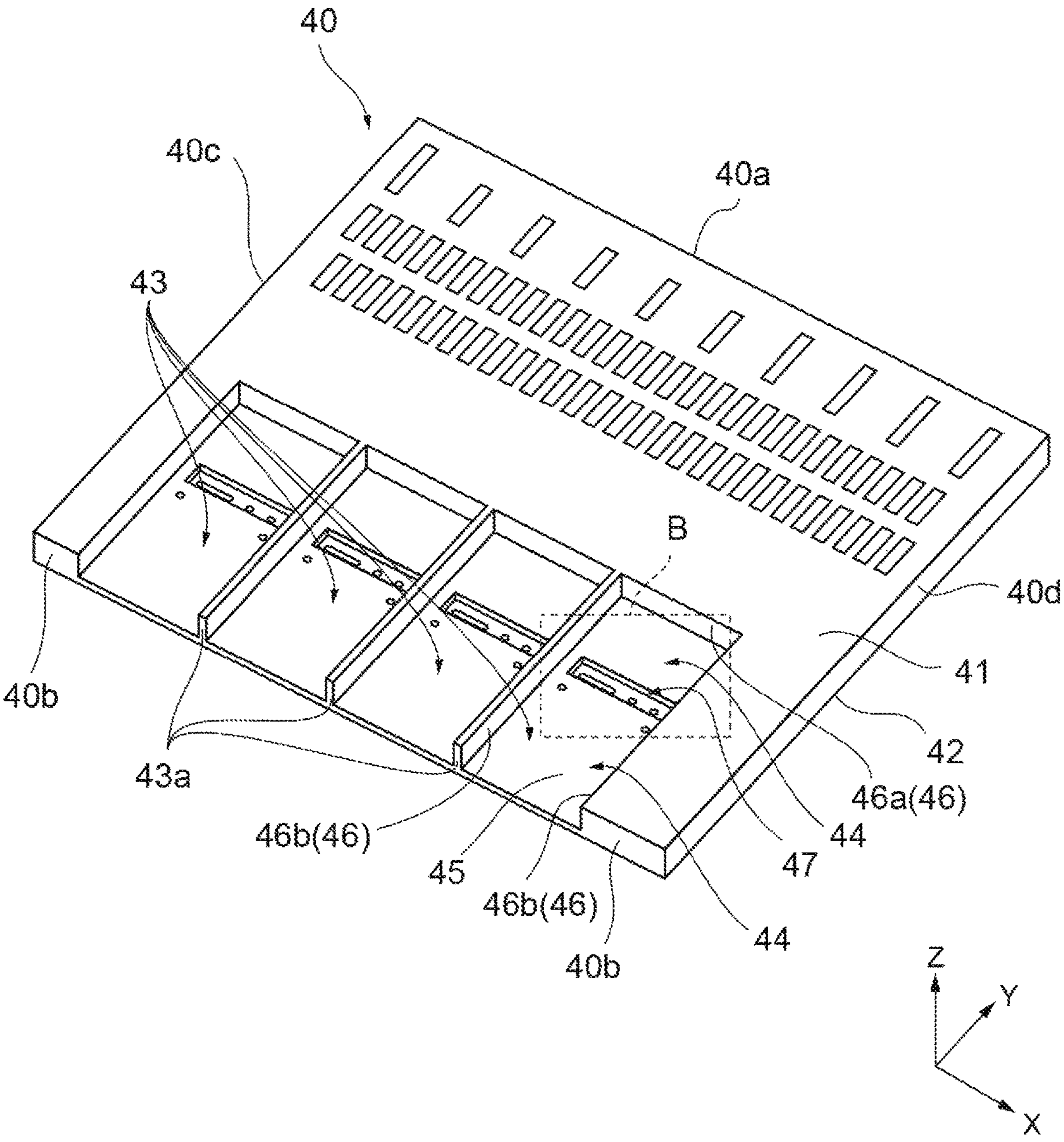
FIG. 7 is a perspective view illustrating the substrate applied to the optical module illustrated in FIG. 3.
Figure 8:
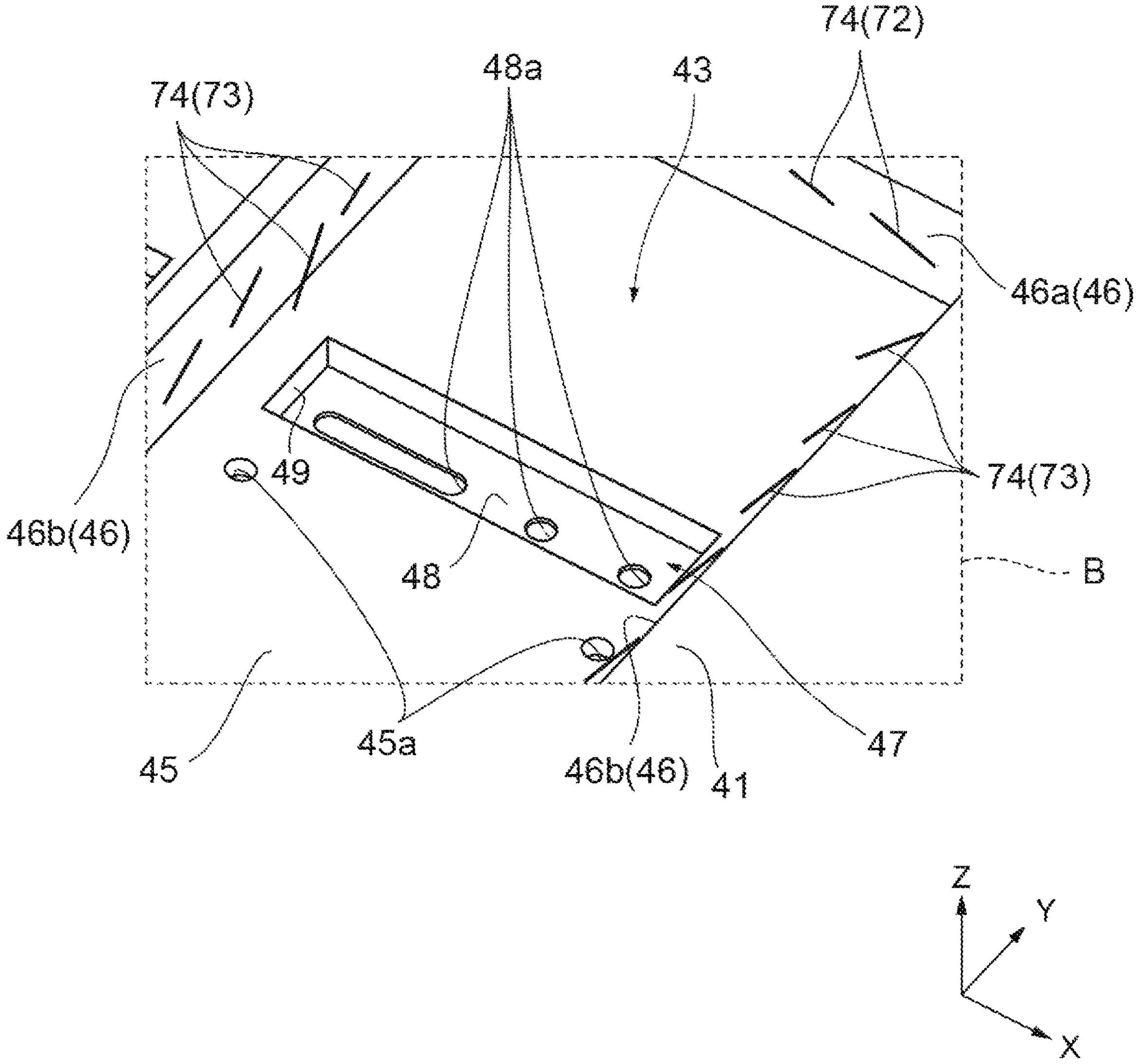
FIG. 8 is an enlarged view of a part surrounded by a dotted line B indicated in FIG. 7.

Next, with reference to FIGS. 7 and 8, a detailed constitution of the substrate 40 will be described. FIG. 7 is a perspective view illustrating the substrate 40. FIG. 8 is an enlarged view of a part surrounded by a dotted line B indicated in FIG. 7. In FIGS. 7 and 8, for the sake of convenience of description, illustration of the optical coupling modules 50 is omitted. As illustrated in FIG. 7, a plurality of cavities 43 are formed in the substrate 40. Each of the cavities 43 is a depression recessed from the first main surface 41 toward the second main surface 42. The optical coupling module 50 is accommodated inside each of the cavities 43. The plurality of cavities 43 are provided side by side in the direction X. The number of cavities 43 may be the same as or larger than the number of optical coupling modules 50 mounted in the substrate 40. In the present embodiment, the same number (four) of cavities 43 as the number of optical coupling modules 50 are formed. For example, each of the cavities 43 may be formed by counterboring. A beam portion 43*a* extending from the inside to the outside of the substrate 40 in the direction Y is provided between the cavities 43 adjacent to each other. The beam portion 43*a* has a shape rising from a first bottom portion 45 of each of the cavities 43 toward the first main surface 41 of the substrate 40.

Each of the cavities 43 includes a first cavity 44 and a second cavity 47. The first cavity 44 is a depression constituting most of the cavity 43 and has the first bottom portion 45 and side surfaces 46. The first bottom portion 45 is a part where the optical coupling module 50 is placed. In the present embodiment, it is a surface extending in the direction X and the direction Y. When viewed in the direction Z, an outer edge of the first bottom portion 45 has a rectangular shape having long sides in the direction Y. The first bottom portion 45 has a size allowing the optical coupling module 50 in its entirety to be placed. The optical coupling module 50 being placed on the first bottom portion 45 includes not only a case where the optical coupling module 50 is placed such that it comes into direct contact with the first bottom portion 45 but also a case where the optical coupling module 50 is placed on the first bottom portion 45 via a member such as an adhesive.

As illustrated in FIG. 8, the first bottom portion 45 has a pair of positioning holes 45*a*. Each of the positioning holes 45*a* is a hole penetrating the first bottom portion 45 to the second main surface 42 (refer to FIG. 4). The pair of positioning holes 45*a* function as a positioning mechanism for the optical coupling module 50 with respect to the cavity 43. For example, the pair of projecting portions corresponding to the pair of positioning holes 45*a* are provided in the optical coupling module 50, and the lens 56 (refer to FIG. 5) and the optical element 60 may be suitably optically coupled by placing the optical coupling module 50 such that each of the pair of projecting portions is fitted into each of the pair of positioning holes 45*a*. The number of positioning holes 45*a* may be one. However, positioning of the optical coupling module 50 can be more accurately performed by forming two or more positioning holes 45*a*. Each of the positioning holes 45*a* may not penetrate from the first bottom portion 45 to the second main surface 42, and it may be a non-penetration hole having a bottom surface.

A configuration of the positioning mechanism used for positioning the optical coupling module 50 is not limited to the positioning holes 45*a*. For example, the lens 56 of the optical coupling module 50 and the optical element 60 may be suitably optically coupled by providing a mark in each of the first bottom portion 45 and the optical coupling module 50 and placing the optical coupling module 50 at a position where the marks overlap each other. In order for the mark provided in the first bottom portion 45 to be able to be visually recognized through the optical coupling module 50, the material of the optical coupling module 50 may be a material allowing visible light to be transmitted therethrough (for example, a glass or a light transmitting resin).

The side surfaces 46 are surfaces rising from the outer edge of the first bottom portion 45 toward the first main surface 41 of the substrate 40. The side surfaces 46 connect the first bottom portion 45 and the first main surface 41 to each other. The side surfaces 46 define outer edge of the first cavity 44 when viewed in the direction Z. The side surfaces 46 may be parallel to the direction Z and may be inclined. The side surfaces 46 include a side surface 46*a* and a pair of side surfaces 46*b*. As illustrated in FIG. 7, the side surface 46*a* is a surface positioned at the end portion near the side surface 40*a* in the first cavity 44 and connects the pair of side surfaces 46*b* to each other. The side surface 46*a* extends in the direction X when viewed in the direction Z. A corner portion where the side surface 46*a* and the first bottom portion 45 intersect may have an R-shape.

The pair of side surfaces 46*b* are surfaces facing each other in the direction X. Each of the side surfaces 46*b* extends in the direction Y when viewed in the direction Z. A corner portion where each of the side surfaces 46*b* and the first bottom portion 45 intersect may have an R-shape. In addition, no side surface is provided in the end portion near the side surface 40*b* in the first cavity 44. That is, the cavity 43 opens on the side surface 40*b*. Accordingly, the optical coupling module 50 can be accommodated inside the cavity 43 through the opening. In addition, in a state where the optical coupling module 50 is accommodated in the cavity 43, the optical fibers 11 connected to the optical coupling module 50 can be drawn out to the outward side of the cavity 43 through the opening.

As illustrated in FIG. 8, the second cavity 47 is a depression provided in the first bottom portion 45 of the first cavity 44. The second cavity 47 is formed to extend in the direction X. The second cavity 47 has a second bottom portion 48 and side surfaces 49. The second bottom portion 48 is positioned closer to the second main surface 42 than the first bottom portion 45. In the present embodiment, the second bottom portion 48 is a surface extending in the direction X and the direction Y. When viewed in the direction Z, an outer edge of the second bottom portion 48 has a rectangular shape having long sides in the direction X. A part of the optical coupling module 50 (a part in which the lens 56 is formed) is placed in the second bottom portion 48 (refer to FIG. 5). The lens 56 is accommodated in the second cavity 47.

A plurality of penetration holes 48*a* are formed in the second bottom portion 48. In the present embodiment, two round holes and one long hole are formed as the penetration holes 48*a* for each second cavity 47. The number and the shape of the penetration holes 48*a* are not limited and may be suitably changed in accordance with the number or the shape of the optical elements 60 mounted on the second main surface 42. As illustrated in FIG. 6, the penetration hole 48*a* penetrates the second bottom portion 48 to the second main surface 42. The light L from the lens 56 toward the optical element 60 passes through the inside of the penetration hole 48*a*. The penetration hole 48*a* has a tapered shape in which the inner diameter decreases from the second bottom portion 48 toward the second main surface 42. The inner diameter and the taper angle of the penetration hole 48*a* are optimized to a size not obstructing the course of the light L. The penetration hole 48*a* may be a straight penetration hole having a constant inner diameter size.

Figure 9:
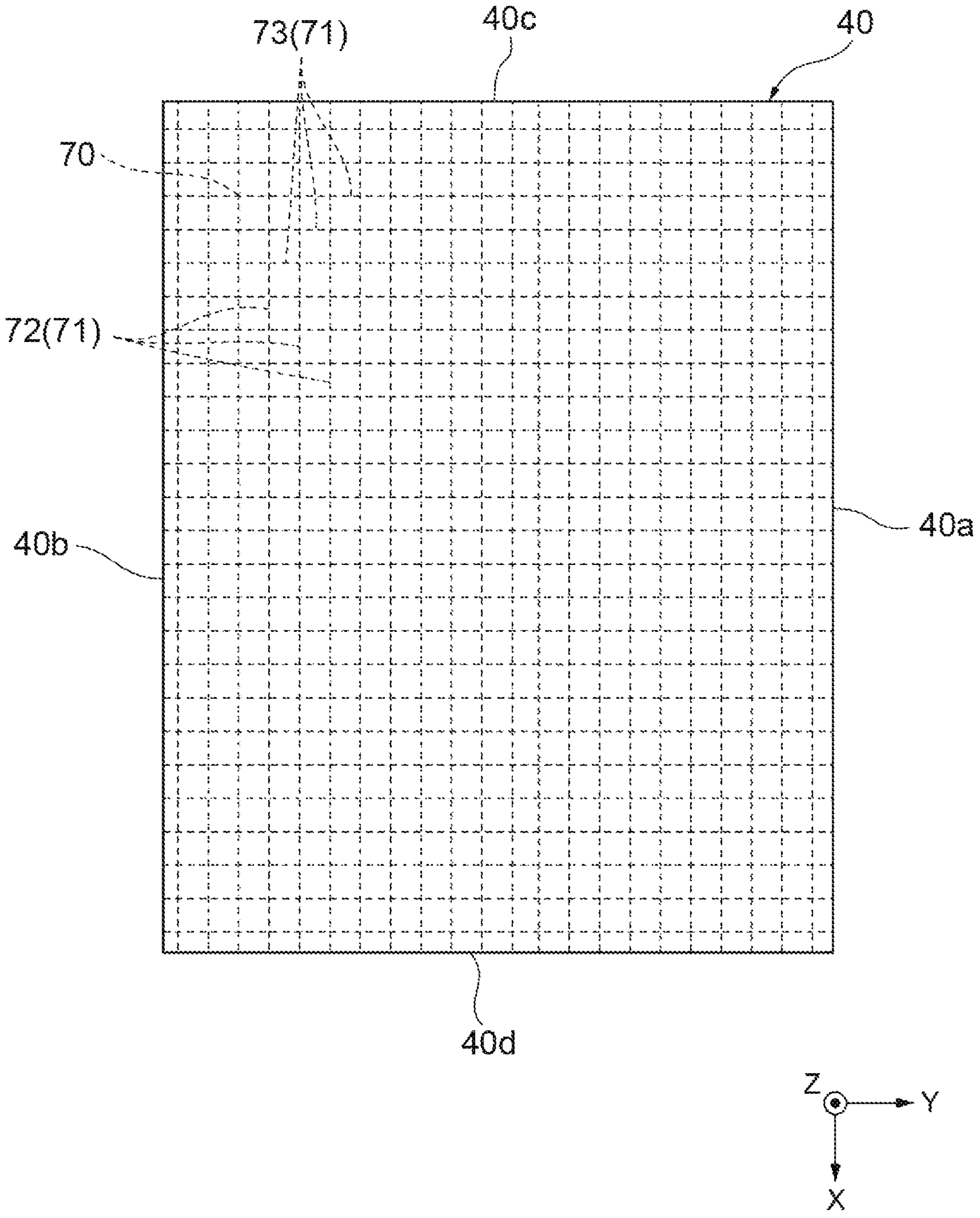
FIG. 9 is a schematic plan view of the substrate in a plan view.

As illustrated in FIG. 8, a plurality of protruding portions 74 (parts of the glass cloth 70) protrude into the cavity 43 from the side surfaces 46 of the first cavity 44. Here, with reference to FIG. 9, details of the glass cloth 70 will be described. FIG. 9 is a schematic view of the substrate 40 in a plan view. FIG. 9 illustrates the substrate 40 before the plurality of cavities 43 are formed. In FIG. 9, illustration of various kinds of constitutions such as the optical elements 60 and the ICs 61 provided in the substrate 40 is omitted.

As illustrated in FIG. 9, the glass cloth 70 is provided inside the substrate 40. The glass cloth 70 is woven fabric constituted of glass threads 71 serving as weft 72 and warp 73. The glass cloth 70 has a sheet shape having meshes. In the glass cloth 70, the weft 72 and the warp 73 regularly intersect each other. The weave density of the weft 72 and the weave density of the warp 73 are equal to or more than 50 threads/25 mm and equal to or less than 100 threads/25 mm, for example. The glass threads 71 constituting the weft 72 and the warp 73 are formed of bundles of approximately several hundred (for example, equal to or more than 100 and equal to or less than 500) glass filaments, for example. The diameter of each of the glass filaments is approximately several μm (for example, equal to or more than 1 μm and equal to or less than 10 μm), for example. In FIG. 9, for the sake of convenience of description, the intervals between threads of the weft 72 and between threads of the warp 73 are illustrated larger than the actual intervals.

The weft 72 extends in the direction X. That is, the weft 72 extends along the pair of side surfaces 40*a* and 40*b* when viewed in the direction Z. The warp 73 extends in the direction Y. That is, the warp 73 extends along the pair of side surfaces 40*c* and 40*d* when viewed in the direction Z. In this manner, if the cavities 43 are formed by counterboring, for example, in the substrate 40 in which the glass cloth 70 is disposed, as illustrated in FIG. 8, parts of the weft 72 and the warp 73 protrude into the cavities 43 from the side surfaces 46 as the protruding portions 74. Specifically, for example, parts of the weft 72 are cut when the cavities 43 are formed, and end portions of the cut weft 72 protrude from the side surface 46*a* as the protruding portions 74. Similarly, parts of the warp 73 are cut when the cavities 43 are formed, and end portions of the cut warp 73 protrude from the respective side surfaces 46*b* as the protruding portions 74.

The side surface 46*a* is formed in the extension direction of the weft 72. The extension direction of the weft 72 is the extension direction of the weft 72 (in the present embodiment, the direction X) positioned inside the substrate 40 and is not the extension direction of the protruding portions 74 protruding from the side surface 46*a*. The protruding portions 74 protruding from the side surface 46*a* may protrude in an irregular direction different from the direction X. For example, lengths of the protruding portions 74 protruding from the side surface 46*a* are equal to or more than 100 μm and equal to or less than 1 mm and are more preferably equal to or more than 100 μm and equal to or less than 200 μm. When a plurality of protruding portions 74 protrude from the side surface 46*a*, the directions and the lengths of the protruding portions 74 may differ from each other. Here, the lengths of the protruding portions 74 denote the average length of ten arbitrary protruding portions 74. The same applies below.

Each of the side surfaces 46*b* is formed in the extension direction of the warp 73. The extension direction of the warp 73 is the extension direction of the warp 73 (in the present embodiment the direction Y) positioned inside the substrate 40 and is not the extension direction of the protruding portions 74 protruding from the respective side surfaces 46*b*. The protruding portions 74 protruding from the respective side surfaces 46*b* may protrude in an irregular direction different from the direction Y. For example, lengths of the protruding portions 74 protruding from the respective side surfaces 46*b* are equal to or more than 100 μm and equal to or less than 1 mm and are more preferably equal to or more than 100 μm and equal to or less than 200 μm. When a plurality of protruding portions 74 protrude from the respective side surfaces 46*b*, the directions and the lengths of the protruding portions 74 may differ from each other. In this manner, the side surfaces 46 in the present embodiment extend in the extension direction of the weft 72 or the warp 73. For this reason, compared to when the side surfaces 46 are inclined with respect to the extension direction of the weft 72 and the warp 73, the glass threads 71 are likely to protrude from the side surfaces 46, and the protruding portions 74 having a large length are likely to be formed.

Figure 10:
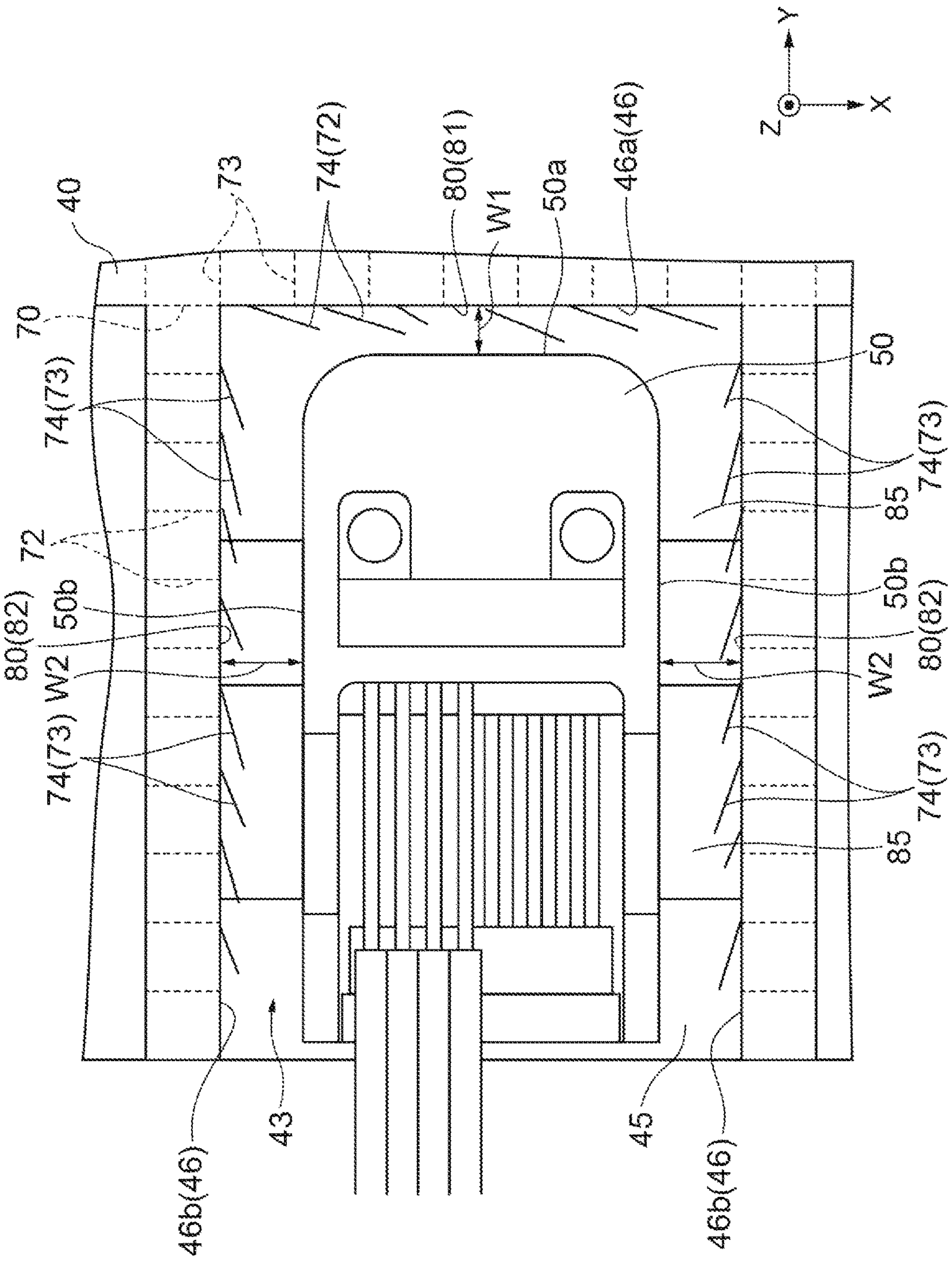
FIG. 10 is a plan view of an optical coupling module accommodated in a cavity.

With reference to FIGS. 5 and 10, a form of accommodating the optical coupling module 50 in the cavity 43 will be described. FIG. 10 is a plan view of the optical coupling module 50 accommodated in the cavity 43. In FIG. 10, for the sake of convenience of description, the intervals between threads of the weft 72 and between threads of the warp 73 are illustrated larger than the actual intervals. In addition, in FIG. 10, illustration of a part of the glass cloth 70 provided inside the substrate 40 and overlapping the first bottom portion 45 is omitted. However, actually, the glass cloth 70 is also provided between the first bottom portion 45 and the second main surface 42 (refer to FIG. 5).

As illustrated in FIG. 5, most of the optical coupling module 50 is accommodated in the first cavity 44, and a part in which the lens 56 is provided (a part protruding downward in the direction Z) is accommodated in the second cavity 47. Parts of the optical fibers 11 positioned on the substrate 40 (attachment parts) extend along the first main surface 41 of the substrate 40. Center axes of the attachment parts are positioned inside the cavity 43. The end portions of the optical fibers 11 extend straight without causing bending on the side surface 40*b* of the substrate 40.

A depth D1 of the first cavity 44 is optimized in accordance with a thickness T of the optical coupling module 50, for example. Here, the depth D1 is a distance from the first main surface 41 to the first bottom portion 45 in the thickness direction (direction Z) of the substrate 40. The thickness T is a distance from the upper surface 52 to the lower surface 53 in the direction Z. The depth D1 may be a size equivalent to half or larger than the thickness T of the optical coupling module 50. In addition, in the present embodiment, the depth D1 is the size equivalent to half or larger than the thickness of the substrate 40 (a distance from the first main surface 41 to the second main surface 42). When the thickness of the substrate 40 is 10, the depth D1 may be equal to or more than 6 and equal to or less than 8, for example. As the depth D1 increases, more parts of the optical coupling module 50 are accommodated in the cavity 43, and therefore the optical module 30 becomes thinner. In the present embodiment, the upper surface 52 is positioned outside the cavity 43 (a side above the first main surface 41). However, the depth D1 may be larger such that the upper surface 52 is positioned inside the cavity 43 (at the same height as the first main surface 41 or on a side below the first main surface 41).

A depth D2 of the second cavity 47 is larger than the depth D1. Here, the depth D2 is a distance from the first main surface 41 to the second bottom portion 48 in the thickness direction of the substrate 40. When the thickness of the substrate 40 is 10, the depth D2 may be equal to or more than 7 and equal to or less than 9, for example. The depth D2 may be optimized in accordance with the thickness T of the optical coupling module 50, for example.

As illustrated in FIG. 10, in the present embodiment, the optical coupling module 50 in its entirety is disposed on the substrate 40. The optical coupling module 50 in its entirety may not be disposed on the substrate 40, and a part of the optical coupling module 50 may be disposed on the outward side of the substrate 40 (a position not overlapping the substrate 40 in the direction Z). For example, the base end part of the optical coupling module 50 (the left side part in FIG. 10) may be disposed on the outward side of the substrate 40.

The optical coupling module 50 is accommodated in the cavity 43 such that gaps 80 are provided between the side surfaces 46 and the optical coupling module 50. Specifically, a gap 81 is provided between the tip surface 50*a* and the side surface 46*a*, and gaps 82 are provided between the respective side surfaces 50*b* and the respective side surfaces 46*b*. A width W1 of the gap 81 in the direction Y may be equal to or more than 50 μm and equal to or less than 500 μm, for example. Widths W2 of the gaps 82 in the direction X may be equal to or more than 50 μm and equal to or less than 750 μm, for example. The widths W2 may be larger than the width W1.

The optical coupling module 50 is fixed to the substrate 40 using an adhesive 85. As illustrated in FIG. 5, the adhesive 85 is disposed between the lower surface 53 and the first bottom portion 45. In order to prevent obstruction to the optical path of the light L by the adhesive 85, the adhesive 85 may not be disposed inside the second cavity 47. In addition, as illustrated in FIG. 10, the adhesive 85 is also disposed in the gap 81 and comes into contact with the protruding portions 74 protruding from the side surface 46*a*. The protruding portions 74 protruding from the side surface 46*a* are stuck into the adhesive 85. Similarly, the adhesive 85 is also disposed in the gaps 82 and comes into contact with the protruding portions 74 protruding from the respective side surfaces 46*b*. The protruding portions 74 protruding from the respective side surfaces 46*b* are stuck into the adhesive 85. For example, the adhesive 85 is a UV curable adhesive or a light transmitting adhesive. All the protruding portions 74 protruding from the side surfaces 46 may not be stuck into the adhesive 85, and at least parts of the protruding portions 74 may be stuck into the adhesive 85.

Subsequently, a method for manufacturing the optical module 30 described above will be described. First, the substrate 40 including the glass cloth 70 constituted of the glass threads 71 serving as the weft 72 and the warp 73 is prepared. Next, the cavities 43 (the first cavities 44 and the second cavities 47) are formed in the substrate 40. The cavities 43 may be formed by counterboring, for example. In a step of forming the cavities 43, the cavities 43 are formed such that the side surfaces 46 extend in the extension direction of at least one of the weft 72 and the warp 73 when viewed in the direction Z. In the present embodiment, the cavities 43 are formed such that the side surface 46*a* extends along the weft 72 and the respective side surfaces 46*b* extend along the warp 73. Parts of the weft 72 and the warp 73 are likely to protrude into the cavities 43 from the side surfaces 46 as the protruding portions 74 by forming the side surfaces 46 in the extension direction of the glass threads 71 (the weft 72 or the warp 73) in this manner. The lengths, the amounts (quantities), or the like of the protruding portions 74 of the glass cloth 70 protruding from the side surfaces of the cavities 43 are adjusted by adjusting processing conditions of counterboring or the like. In order to make the protruding portions 74 easy to be stuck into the adhesive 85 in a step of fixing the optical coupling modules 50 to the substrate 40 which will be performed later, the direction of the protruding portions 74 may be adjusted such that they stand with respect to the side surfaces 46. For example, adjustment of the direction of the protruding portions 74 may be directly performed by the hand of a worker or may be performed by spraying air to the protruding portions 74 or the like. In addition, in the step of forming the cavities 43, a plurality of penetration holes 48*a* directed from the second bottom portions 48 of the second cavities 47 to the second main surface 42 are formed.

Next, the optical coupling modules 50 are accommodated inside the cavities 43, and the optical coupling modules 50 are fixed to the substrate 40 using the adhesive 85. Specifically, after the adhesive 85 is applied to a region in which the second cavities 47 are not formed in the first bottom portion 45, the optical coupling modules 50 are accommodated such that the lower surface 53 comes into contact with the adhesive 85. At this time, as illustrated in FIG. 10, the optical coupling modules 50 are accommodated such that the gap 81 is provided between the tip surfaces 50*a* and the side surface 46*a* and the gaps 82 are provided between the respective side surfaces 50*b* and the respective side surfaces 46*b*. For example, the adhesive 85 spreads due to the empty weights of the optical coupling modules 50 and flows into the gaps 81 and 82. Accordingly, each of the protruding portions 74 is stuck into the adhesive 85 stored in the gaps 81 and 82. The amount of the applied adhesive 85 is adjusted such that the adhesive 85 flows into the gaps 80 and each of the protruding portions 74 is stuck into the adhesive 85. The amount of the applied adhesive 85 per optical coupling module 50 is equal to or more than 1 mg and equal to or less than 10 mg, for example.

Next, the plurality of optical elements 60 and the plurality of ICs 61 are mounted on the second main surface 42. At this time, each of the optical elements 60 is mounted such that it overlaps each of the corresponding penetration holes 48*a* in the direction Z. From the above, a step of manufacturing the optical module 30 ends.

Hereinabove, in the optical module 30 and the optical connector cable 1 according to the present embodiment, a part of the glass cloth 70 (protruding portions 74) protrudes into the cavities 43 from the side surfaces 46 of the cavities 43. In addition, the protruding portions 74 are stuck into the adhesive 85 fixing the optical coupling modules 50 to the substrate 40. Accordingly, the contact area between the adhesive 85 and the substrate 40 increases by surface areas of the protruding portions 74, and the protruding portions 74 can function as anchors with respect to the adhesive 85. For this reason, the adhesive strengths of the optical coupling modules 50 with respect to the substrate 40 can be improved.

In the foregoing embodiment, the glass cloth 70 is constituted of the glass threads 71 serving as the weft 72 and the warp 73. The side surfaces 46 are formed in the extension direction of at least one of the weft 72 and the warp 73 when viewed in the direction Z. In this case, since the protruding portions 74 having a large length are formed, the contact area between the adhesive 85 and the substrate 40 further increases. For this reason, the adhesive strengths of the optical coupling modules 50 with respect to the substrate 40 can be further improved.

In the foregoing embodiment, the optical coupling modules 50 are accommodated inside the cavities 43 such that the gaps 80 are provided between the side surfaces 46 and the optical coupling modules 50. The adhesive 85 is disposed in the gaps 80. The widths W1 and W2 of the gaps 80 may be equal to or more than 50 μm and equal to or less than 750 μm. In this case, since the adhesive 85 can be stored inside the gaps 80 where the protruding portions 74 are positioned, surfaces of the protruding portions 74 can be adequately brought into contact with the adhesive 85. In addition, since the widths W1 and W2 of the gaps 80 are equal to or more than 50 μm and equal to or less than 750 μm, a moderate amount of adhesive 85 can be stored inside the gaps 80. For this reason, the adhesive strengths of the optical coupling modules 50 with respect to the substrate 40 can be further improved.

In the foregoing embodiment, the lengths of the protruding portions 74 may be equal to or more than 100 μm and equal to or less than 1 mm. In this case, since the lengths of the protruding portions 74 are equal to or more than 100 μm, the contact areas on the surfaces of the protruding portions 74 with respect to the adhesive 85 can be sufficiently secured. For this reason, the adhesive strengths of the optical coupling modules 50 with respect to the substrate 40 can be further improved. In addition, since the lengths of the protruding portions 74 are equal to or less than 1 mm, the protruding portions 74 are unlikely to be hindrances to accommodation when the optical coupling modules 50 are accommodated inside the cavities 43. For this reason, the optical coupling modules 50 can be easily accommodated in the cavities 43.

In the foregoing embodiment, the optical coupling modules 50 respectively have the groove portions 51 (holding portions) for holding the end portions of the optical fibers 11 optically coupled to the optical elements 60 via the optical coupling modules 50. In this case, since the end portions of the optical fibers 11 are adequately held by the groove portions 51 of the optical coupling modules 50, optical coupling between the optical elements 60 and the optical fibers 11 can be more accurately performed.

In the foregoing embodiment, the penetration holes 48*a* penetrating the second bottom portion 48 to the second main surface 42 are formed in the cavities 43. The optical elements 60 are mounted on the second main surface 42 so as to overlap the penetration holes 48*a* when viewed from above the second main surface 42 (in the direction Z). In this case, the optical coupling modules 50 and the optical elements 60 mounted on the second main surface 42 of the substrate 40 can be optically coupled through a simple constitution such as the penetration holes 48*a*.

In the foregoing embodiment, the cavities 43 have the first cavities 44 near the first main surface 41 and the second cavities 47 having the second bottom portion 48 positioned closer to the second main surface 42 than the first bottom portions 45 of the first cavities 44. In this case, the entire regions of the cavities 43 can be made smaller by making only the cavity parts (parts of the second cavities 47) mainly accommodating components such as the lenses 56 that are likely to become components protruding from the lower surfaces 53 of the optical coupling modules 50 be deep and making other parts (parts of the first cavities 44) be shallower than the cavity parts. As a result, the strength of the substrate 40 can be maintained even by a constitution in which the cavities 43 are provided in the substrate 40.

In the method of manufacturing the optical module 30 according to the present embodiment, a part of the glass cloth 70 is caused to protrude into the cavities 43 from the side surfaces 46 of the cavities 43 as the protruding portions 74. In addition, the adhesive 85 is applied such that the protruding portions 74 are stuck into the adhesive 85. Accordingly, the contact area between the adhesive 85 and the substrate 40 increases by the surface areas of the protruding portions 74, and the protruding portions 74 can function as anchors with respect to the adhesive 85. For this reason, the adhesive strengths of the optical coupling modules 50 with respect to the substrate 40 can be improved.

Hereinabove, an embodiment of the present disclosure has been described in detail, but the present disclosure is not limited to the foregoing embodiment and can be applied to various embodiments. For example, the cavities 43 may not have the second cavities 47 and the depths thereof may be uniformly formed. At this time, the entire bottom portions of the cavities 43 are flat placement surfaces, and the optical coupling modules 50 may be placed on the placement surfaces. In addition, the first bottom portions 45 of the first cavities 44 may have a plurality of projecting portions, and the optical coupling modules 50 may be placed on the plurality of projecting portions.

The optical module 30 in the foregoing embodiment has a constitution in which the light L emitted from the optical fibers 11 is incident on the optical elements 60. However, a constitution in which light emitted from the optical elements 60 is incident on the optical fibers 11 may be adopted. At this time, the optical elements 60 may be light emitting elements such as vertical cavity surface emitting laser (VCSEL). Light emitted from the optical elements 60 may be converted into collimated light (parallel light) by the lenses 56, may be reflected by the mirrors 55, and then may be incident on the optical fibers 11.

In the foregoing embodiment, a case where the protruding portions 74 protrude from the side surfaces 46 of the first cavities 44 has been described as an example. However, the protruding portions 74 may also protrude from the side surfaces 49 of the second cavities 47. The side surfaces 49 of the second cavities 47 are surfaces connecting the second bottom portions 48 and the first bottom portions 45 to each other and are formed to rise from the outer edges of the second bottom portions 48 toward the first bottom portions 45. The side surfaces 49 of the second cavities 47 may be formed in the extension direction of at least one of the weft 72 and the warp 73 when viewed in the direction Z. The adhesive 85 may also be disposed inside the second cavities 47 and may come into contact with the protruding portions 74 protruding from the side surfaces 49 of the second cavities 47.

REFERENCE SIGNS LIST

1 Optical connector cable
10 Optical fiber cable
11 Optical fiber
12 Cable sheath
20 Protective member
21 Inner layer
22 Outer layer
30 Optical module
40 Substrate
40*a*, 40*b*, 40*c*, 40*d* Side surface
41 First main surface
41*a* Pattern
42 Second main surface
43 Cavity
43*a* Beam portion
44 First cavity
45 First bottom portion
45*a* Positioning hole
46, 46*a*, 46*b* Side surface
47 Second cavity
48 Second bottom portion
48*a* Penetration hole
49 Side surface
50 Optical coupling module
50*a* Tip surface
50*b* Side surface
51 Groove portion
52 Upper surface
53 Lower surface
55 Mirror
56 Lens
60 Optical element
61 IC
70 Glass cloth
71 Glass threads

72 Weft
73 Warp
74 Protruding portion
80, 81, 82 Gap
85 Adhesive
F Focus
L Light
W1 Width
W2 Width

The invention claimed is:

1. An optical module comprising:

a substrate including a glass cloth therein;

an optical element mounted on the substrate;

an optical coupling module configured to be optically coupled to the optical element; and an adhesive fixing the optical coupling module to the substrate, wherein a cavity recessed from a first main surface of the substrate toward a second main surface of the substrate so as to include a bottom portion is formed in the substrate, and at least a part of the optical coupling module is accommodated in the cavity, the glass cloth includes a protruding portion protruding into the cavity from a side surface of the cavity, and the protruding portion is stuck into the adhesive positioned between the side surface and the optical coupling module.

2. The optical module according to claim 1, wherein the glass cloth is constituted of glass threads serving as weft and warp, and the side surface is formed in an extension direction of at least one of the weft and the warp when viewed in a thickness direction of the substrate.

3. The optical module according to claim 2, wherein the glass threads constituting at least one of the weft and the warp are formed of bundles of a plurality of glass filaments, and a diameter of each of the plurality of glass filaments is equal to or less than 10 μm.

4. The optical module according to claim 2, wherein a weave density of the glass threads in at least one of the weft and the warp is equal to or more than 50 threads/25 mm and equal to or less than 100 threads/25 mm.

5. The optical module according to claim 1, wherein the optical coupling module is accommodated inside the cavity such that a gap is provided between the side surface and the optical coupling module, and the adhesive is disposed in the gap.

6. The optical module according to claim 5, wherein a width of the gap is equal to or more than 50 μm and equal to or less than 750 μm.

7. The optical module according to claim 1, wherein a length of the protruding portion is equal to or more than 100 μm and equal to or less than 1 mm.

8. The optical module according to claim 1, wherein the optical coupling module includes a holding portion for holding end portions of optical fibers optically coupled to the optical element via the optical coupling module.

9. The optical module according to claim 1, wherein a penetration hole penetrating the bottom portion to the second main surface is formed in the cavity, and the optical element is mounted on the second main surface so as to overlap the penetration hole when viewed from above the second main surface.

10. The optical module according to claim 1, wherein the cavity includes a first cavity and a second cavity including a second bottom portion positioned closer to the second main surface than a first bottom portion of the first cavity.

11. The optical module according to claim 10, wherein the first bottom portion of the first cavity is provided with a positioning hole recessed from the first bottom portion toward the second main surface.

12. The optical module according to claim 10, wherein the second bottom portion of the second cavity is provided with a plurality of penetration holes penetrating the second bottom portion to the second main surface.

13. An optical module comprising:

a substrate including a glass cloth therein;

a plurality of optical elements mounted on the substrate;

a plurality of optical coupling modules configured to be optically coupled to the plurality of respective optical elements; and adhesives respectively fixing the plurality of optical coupling modules to the substrate, wherein a plurality of cavities recessed from a first main surface of the substrate toward a second main surface of the substrate so as to each include a bottom portion are formed in the substrate, and each of the plurality of optical coupling modules is accommodated in each of the plurality of cavities, the glass cloth includes a plurality of protruding portions protruding into the plurality of cavities from respective side surfaces of the plurality of cavities, and the plurality of protruding portions are respectively stuck into the adhesives positioned between the respective side surfaces and the plurality of optical coupling modules.

14. An optical connector cable comprising:

the optical module according to claim 1; and an optical fiber cable including at least one optical fiber, wherein the optical fiber cable is attached to the optical module such that the optical fiber is optically coupled to the optical element via the optical coupling module.

15. A method for manufacturing an optical module comprising:

preparing a substrate including a glass cloth;

forming a cavity recessed from a first main surface of the substrate toward a second main surface of the substrate in the substrate so as to include a bottom portion; and accommodating at least a part of an optical coupling module configured to be optically coupled to an optical element inside the cavity and fixing the optical coupling module to the substrate using an adhesive, wherein in the forming the cavity, a part of the glass cloth is caused to protrude into the cavity from a side surface of the cavity as a protruding portion, and in the fixing the optical coupling module to the substrate, the adhesive is applied to the inside of the cavity such that the protruding portion is stuck into the adhesive.

* * * * *